United States Patent [19]

Hoffman

[11] 4,386,750

[45] Jun. 7, 1983

[54] METHOD OF DAMPING NUTATION MOTION WITH MINIMUM SPIN AXIS ATTITUDE DISTURBANCE

[75] Inventor: Henry C. Hoffman, Baltimore, Md.

[73] Assignee: The United States of America as represented by the Administrator of the National Aeronautics and Space Administration, Washington, D.C.

[21] Appl. No.: 182,881

[22] Filed: Aug. 29, 1980

[51] Int. Cl.³ .......................... B64G 1/26; B64G 1/38
[52] U.S. Cl. ..................................... 244/169; 244/170
[58] Field of Search ................ 244/169, 170, 164, 172

[56] References Cited

U.S. PATENT DOCUMENTS

| | | | |
|---|---|---|---|
| 3,189,299 | 6/1965 | Garner et al. | 244/169 |
| 3,643,897 | 2/1972 | Johnson | 244/169 |
| 3,758,051 | 9/1973 | Williams | 244/170 |
| 3,937,423 | 2/1976 | Johansen | 244/169 |
| 3,944,172 | 3/1976 | Becker | 244/169 |

FOREIGN PATENT DOCUMENTS 2040513  8/1980  United Kingdom ................ 244/169

OTHER PUBLICATIONS

Clark, R. N. et al., "Scheme to Improve Limit Cycle Performance of an Attitude Control System", *Journal of Spacecraft and Rockets*, vol. 12, No. 4, Apr., 1974, pp. 253–254.

Primary Examiner—Charles E. Frankfort
Attorney, Agent, or Firm—John O. Tresansky; John R. Manning; Ronald F. Sandler

[57] ABSTRACT

In a method of and apparatus for damping nutation of a spinning spacecraft (10), spin axis attitude disturbances are substantially reduced by controlling at least one nutation damping gas thruster (18) to fire with non-uniform gas pulses. During the beginning of a nutation control sequence, the duration of successive gas pulses is gradually increased (up pulsed) from zero to a predetermined maximum duration. The duration of successive pulses is then maintained constant for a time period. Finally, at the end of the nutation control sequence, the duration of successive gas pulses is gradually reduced to zero (down pulsed). Up pulsing of the gas thruster (18) is initiated in response to a predetermined maximum nutation angle measured by an accelerometer (20). Down pulsing of the thruster (18) is initiated in response to a predetermined minimum nutation angle. The number of variable and constant duration gas pulses delivered by the thruster (18) depends upon the mass distribution of the spacecraft (10).

13 Claims, 9 Drawing Figures

METHOD OF DAMPING NUTATION MOTION WITH MINIMUM SPIN AXIS ATTITUDE DISTURBANCE

ORIGIN OF THE INVENTION

The invention described herein was made by an employee of the U.S. Government and may be manufactured and used by or for the Government for Governmental purposes without the payment of any royalties thereon or therefor.

TECHNICAL FIELD

The present invention relates generally to nutation motion control in spining bodies, and more particularly, to a method of and apparatus for damping nutation motion in a spin stabilized spacecraft with minimum spin axis attitude disturbance.

BACKGROUND ART

Orbiting spacecraft are commonly stabilized by spinning them about their longitudinal axes. Any lateral perturbations, such as those produced by roll or yaw tip off torques that occur at booster separation or by energy dissipation due to sloshing of fuel within the fuel tanks, cause nutation motion to develop whereby the spacecraft tends to cone about the nominal spin axis. The nutation has a frequency generally corresponding to the spin rate and mass distribution of the spacecraft. A general discussion of nutation motion is given in Section 9-12 of Sears, Zemansky and Young, University Physics, Fifth Edition, Addison Wesley Publishing Company, 1977.

In general, nutation is a word commonly used to describe a coning motion of the nominal spin axis of a spinning body about a line fixed in space and determined by the inertial orientation of the angular momentum vector for the system. The inertial nutation frequency $\dot{\psi}$ in radians per second is:

$$\dot{\psi} = H/A \tag{1}$$

where
  H = magnitude of the system angular momentum in ft-lb-sec, and
  A = system transverse moment of inertia in ft-lb-sec$^2$ (with "transverse" implying normal to the nominal spin axis)

Active nutation damping is a process which reduces the magnitude of a nutation angle $\theta$ by the application of properly timed torque vector pulses to the body. These pulses are typically produced by the firing of hot or cold gas thrusters. If T is the applied torque vector, the response of the system is determined by the following differential equation:

$$(d/dt)\vec{H} = \vec{T} \tag{2}$$

The timing of the pulses is selected in such a way that the angular momentum vector is moved toward the nominal spin axis with each firing, thus causing a nutation angle reduction. The period P of gas thruster pulsing is determined by:

$$P = \left| \frac{2\pi\sigma}{\dot{\psi}\cos\theta(\sigma - 1)} \right| \tag{3}$$

where
  $\sigma = C/A$ = system moment of inertia ratio and
  C = system spin axis moment of inertia and
  $\theta$ = nutation angle (usually very small)

The phasing of the pulses is controlled relative to the output of the nutation sensor, e.g., a linear or angular accelerometer, on the spinning body. A typical nutation damping sequence consists of a series of consecutive, constant magnitude pulses which terminates when the amplitude of the sensor output is reduced to a magnitude below a predetermined threshold level.

In general, each torque pulse applied to the spinning body changes the inertial orientation of the angular momentum vector which in general represents an undesirable side effect. For a series of constant duration pulses, the inertial motion of the momentum vector is quasi-periodic. A typical momentum vector path viewed from a position above the initial angular momentum vector is in the form of an open or closed regular polygon. The net spin axis attitude disturbance produced by the series of pulses depends upon where the angular momentum vector is located after the last thruster firing. The size of the polygon is related to the moment of inertia ratio $\sigma$ and increases without limit as $\sigma \to 1$.

The nominal orientation of the spin stabilized spacecraft is critical because the craft must be oriented precisely among other reasons to ensure proper heading during thrusting to reposition the craft; it is thus necessary to minimize attitude disturbances which tend to occur as the nutation damping jets are fired during a nutation control sequence to return the craft to its near zero nutation condition.

It is possible to control within limits the attitude disturbances by controlling the number of constant duration pulses fired. In the constant duration firing pulse strategy of the prior art, the control strategy requires precise knowledge of the system moment of inertia ratio that is difficult to predict. Furthermore, some inertia ratios do not lend themselves to this approach.

It is accordingly an object of the present invention to provide a method of damping nutation motion in a spinning body that produce minimum attitude disturbances about the nominal spin axis of the spacecraft.

Another object is to provide a new and improved method of damping nutation motion in a spacecraft, wherein no knowledge of system moment of inertia ratio is required.

Another object is to provide a method of damping nutation motion in a spacecraft at high thruster usage efficiency.

DISCLOSURE OF INVENTION

In accordance with the invention, nutation motion of a spacecraft is measured by a nutation sensor such as an angular accelerometer or other nutation sensor. In response to a predetermined nutation angle of the craft, at least one thruster is pulsed synchronously with the nutation of the spacecraft to reorient the craft toward its nominal momentum vector. Pulsing of the thruster is regulated such that successive pulses during an up pulse control sequence gradually increase in duration from near zero to a predetermined maximum duration. The maximum pulse duration is maintained in successive thruster pulses until the nutation angle of the spacecraft is reduced to a predetermined minimum angle. Thereafter, the successive thruster pulses are gradually reduced in duration from the maximum duration to zero during a down pulse control sequence. The application of thruster pulses having successively increasing and successively decreasing pulse durations rather than constant durations reduces spin axis attitude disturbances by a large factor depending upon the number and duration of thruster pulses applied during the up pulse and down pulse control sequences. The reduction of the attitude disturbance is roughly equal to the ratio of maximum pulse duration to the step size or the number of steps required to achieve the maximum pulse duration.

BRIEF DESCRIPTION OF DRAWINGS

FIG. 5 is a diagram of the momentum vector trajectory during up pulsing of the thruster corresponding to the waveform shown in FIG. 4a;

DETAILED DESCRIPTION OF THE INVENTION

Figure 1:
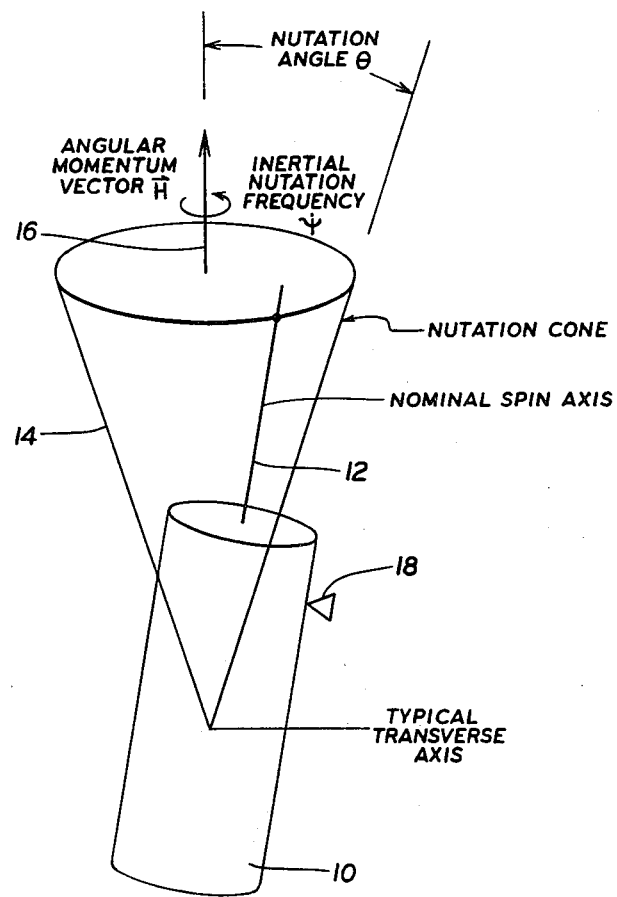
FIG. 1 is a schematic drawing of a spin stabilized body undergoing nutation motion.
Figure 2:
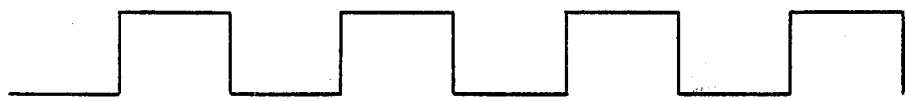
FIG. 2 is a diagram of a control signal for controlling operation of the gas thrusters in a constant pulse duration nutation damping sequence of the prior art.

Referring to FIGS. 1 and 2, assuming that spin stabilized spacecraft 10 is spinning on a nominal spin axis 12 and is undergoing nutation motion along cone 14 about angular momentum vector 16, a hot or cold gas thruster 18 is periodically fired so as to step the angular momentum vector 16 toward the nominal spin axis 12 and thereby reduce the magnitude of nutation angle $\theta$ toward zero. This is provided in prior art thruster type nutation damping systems by pulsing thruster 18 with equal pulse durations in synchronism with nutation in accordance with the control waveform shown in FIG. 2. These control pulses are initiated when the nutation angle $\theta$, detected by a linear or angular accelerometer 20 (FIG. 7), or other type of nutation sensor, is greater than a predetermined maximum nutation angle; when the nutation angle $\theta$ has diminished to a predetermined minimum nutation angle, the pulsing of thruster 18 is terminated. Each time the thruster 18 is pulsed, the momentum vector 16 is stepped transversely in a direction dependent upon the angular position of the thruster about spin axis 12 at the moment of firing.

Figure 3:
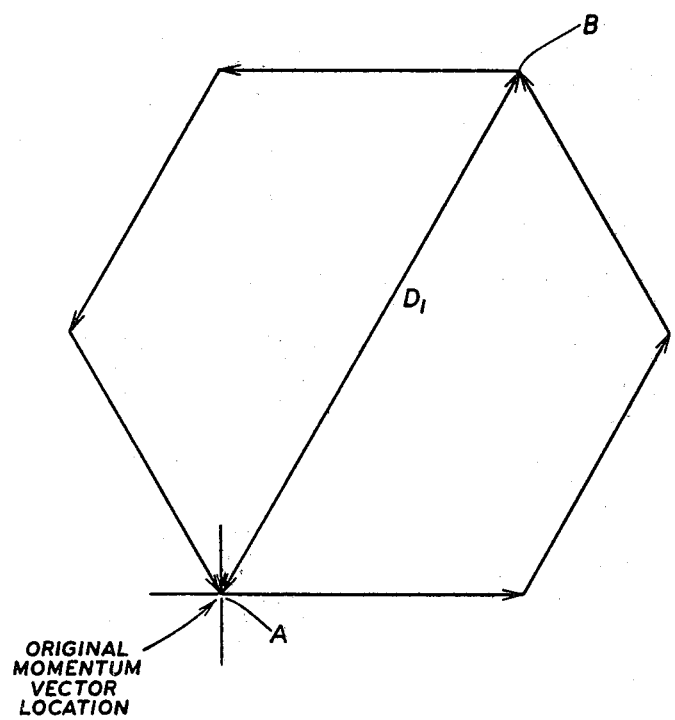
FIG. 3 is a diagram of the trajectory of a typical momentum vector viewed from above a spin stabilized body undergoing nutation damping using prior art, constant duration gas thruster pulsing.

Assuming that thruster 18 is fired with constant duration pulses as shown in FIG. 2 synchronously with nutation of spacecraft 10, i.e., once every nutation cycle, the momentum vector is stepped as shown by the polygonal trajectory as viewed from above in FIG. 3. The number of sides of the polygon shown in FIG. 3 is six; any number of sides may occur in practice, including fractional numbers which means the polygon is not closed, depending upon the inertia properties of the body 10. The size of each side of the polygon depends upon the magnitude and duration of the thruster pulses; in general, the polygon is not closed.

Assuming as in FIG. 3 that nutation damping is completed after a sequence of six firing pulses by thruster 18 with the momentum vector having an original location at position A, the momentum vector is finally located back at its original spin axis position A so that there is no net attitude displacement of the spacecraft as a result of the nutation control sequence. This is also true for any integer multiple of six firing pulses. In the event that pulsing is terminated after three pulses or an odd integer multiple thereof, however, the momentum vector is located at point B on the polygon which is maximally displaced from the original point A by a distance $D_1$ and therefore results in maximum net attitude error of the spin axis. Thus, the worst case attitude error in the system characterized by the polygon of FIG. 3 is equal to the distance $D_1$ extending between points A and B on the polygon.

The worst case attitude error is reduced, in accordance with the invention, by pulsing thruster 18 with nonuniform duration pulses at the beginning and end of the nutation control sequence. Thus, the duration of thruster pulses is controlled to increase successively (up pulse) from about zero to a predetermined maximum pulse duration during a build up mode at the beginning of the sequence and to decrease successively (down pulse) from the predetermined maximum pulse duration to about zero during a pull down mode at the end of the sequence. Pulses of the maximum duration may be maintained for a period of time between the build up and pull down modes until the nutation angle $\theta$ has been reduced to a predetermined minimum nutation angle.

Figure 4A:
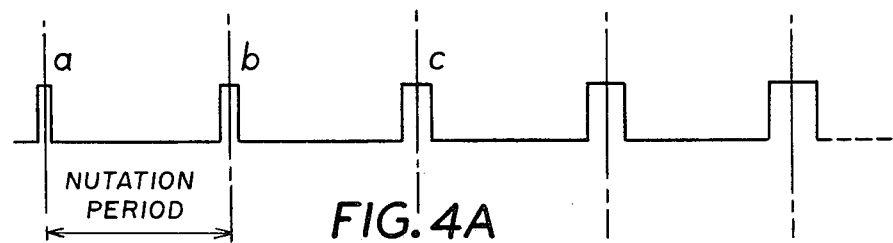
FIGS. 4a–4c are diagrams of control waveforms for pulsing the gas thruster with non-uniform pulse durations to reduce attitude disturbances in accordance with the invention.
Figure 4B:
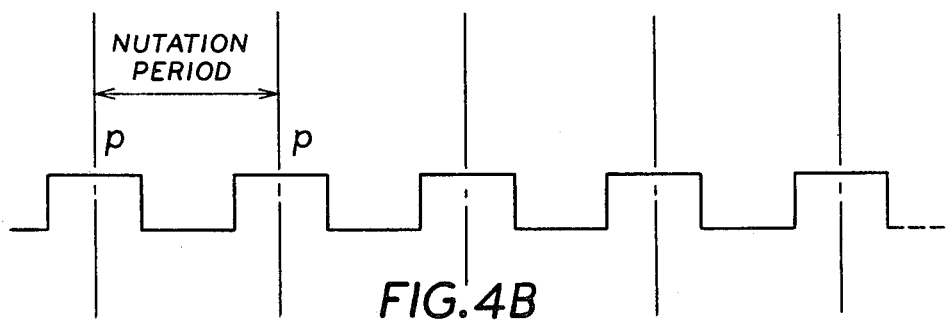
Figure 4C:
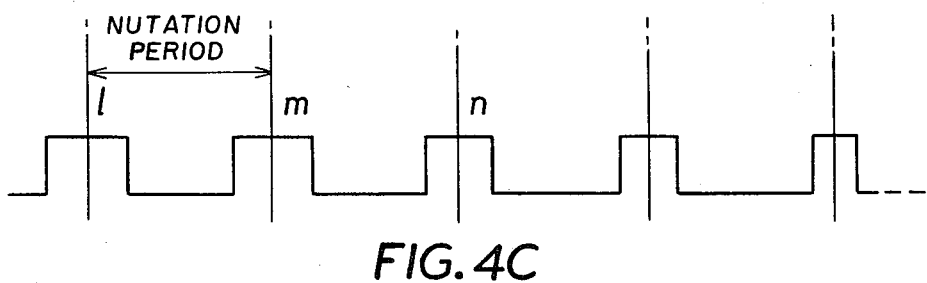

Referring to FIG. 4a, the duration of successive pulses a, b, c, . . . applied to control gas thruster 18 increases from zero to a predetermined maximum duration in equal steps, e.g., 10% steps for a total of 10 pulses. In FIG. 4b, when the predetermined maximum duration is reached, the thruster 18 is thereafter pulsed with equal pulses p having the predetermined maximum pulses duration until the nutation angle $\theta$ has been reduced to a predetermined minimum nutation angle. In FIG. 4c, the durations of the damping pulses l, m, n; . . . are finally reduced from the predetermined maximum duration to zero in equal steps, e.g., 10 pulses, with successive pulses having periods reduced in 10% steps.

Figure 5:
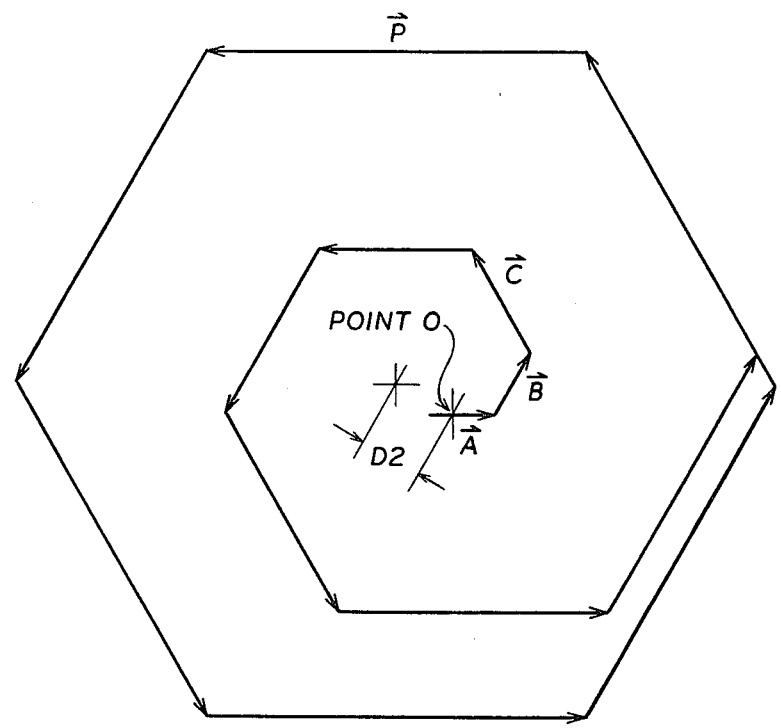

Referring to FIG. 5, the trajectory of the momentum vector that occurs in response to thruster pulses having increasing pulse durations in a build up mode corresponding to the waveform of FIG. 4a is in the form of an outwardly emerging spiral formed of segments having lengths corresponding to the durations of the respective thruster pulses. Thus, the first momentum displacement vector $\vec{A}$ in FIG. 5 corresponds to gas pulse a in FIG. 4a, the second displacement vector $\vec{B}$ in FIG. 5 corresponds to the next successive pulse b in FIG. 4a, etc. The equal length, maximum displacement vectors $\vec{P}$ in FIG. 5 correspond to maximum duration pulses p in FIG. 4b. It is noted that the trajectory of the annular momentum vector during gas pulsing by control waveform p steps around the original momentum vector location point 0 as shown by the polygon. It should be noted that point 0 is displaced from the center of the polygon by a distance $D_2$ which represents the attitude error resulting from the build up mode. This is in contrast with the polygonal trajectory in FIG. 3 using equal duration damping pulses wherein the original momentum vector location is on one corner of the polygon.

Figure 6:
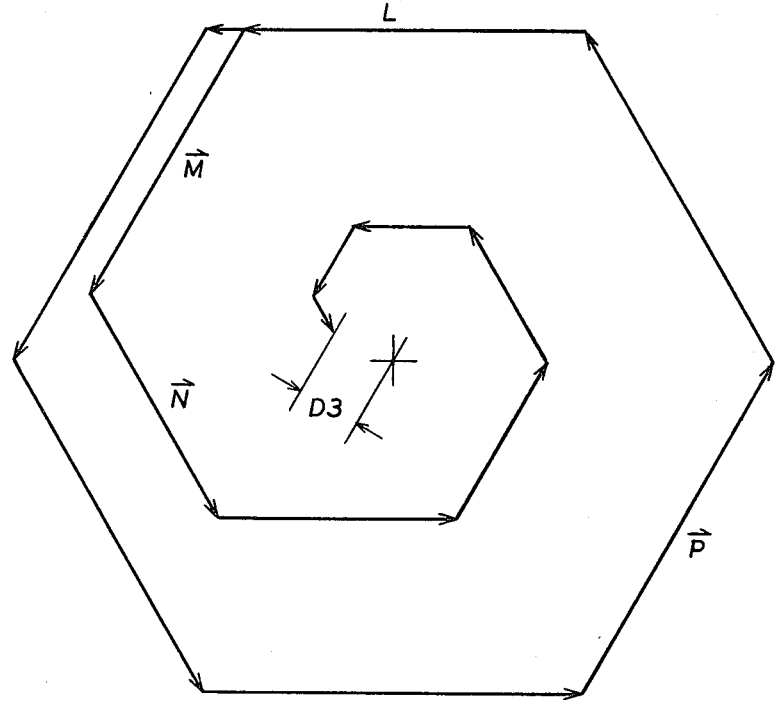
FIG. 6 is a diagram of the momentum vector trajectory during thruster down pulsing corresponding to the waveform shown in FIG. 4c.

Referring now to FIG. 6, the displacement vectors $\vec{L}$, $\vec{M}$, $\vec{N}$, ... at the end of a nutation control sequence correspond respectively to successive gas pulses l, m, n, ... FIG. 4c. It is noted that the trajectory in FIG. 6 is approximately the inverse of the trajectory of FIG. 5 and that the trajectory spirals inwardly toward the original momentum vector location 0. The distance $D_3$ is an additional attitude disturbance resulting from the pull down mode pulsing. The worst case attitude error distance $D_2 + D_3$ produced by the non-uniform duration pulse nutation control strategy of the present invention has been reduced by a factor of 5 relative to the worst case attitude disturbance distance $D_1$ produced by the uniform duration pulse nutation control strategy in FIG. 3. The final location of the momentum vector relative to the original momentum vector location, representing attitude displacement, is a function of the step size of the displacement vectors $\vec{A}$, $\vec{B}$, $\vec{C}$, ... $\vec{L}$, $\vec{M}$, $\vec{N}$, .... Thus, the smaller the step size, the closer the final position of the momentum vector is relative to the initial position and consequently the smaller the attitude disturbance distance $D_2 + D_3$. In the limit, as the step size approaches zero, the momentum vector trajectory will approach the starting momentum vector position A with a resultant zero attitude disturbance error. As a practical matter, however, the displacement vector steps cannot be made arbitrarily small because each step must be large enough to allow the maximum step size to be reached before nutation control of the spacecraft is lost. This factor depends upon the on board dissipation, e.g., fuel slosh, moving appendages, nutation damper, and the mass distribution characteristics of the spinning body. It is, therefore, desirable to keep the step size small (number of steps large) to minimize the attitude disturbance but still keep the step size sufficiently large to prevent the loss of the nutation control. Thus, the step size and number of steps should be optimized based on allowable attitude error and required nutation control.

Figure 7:
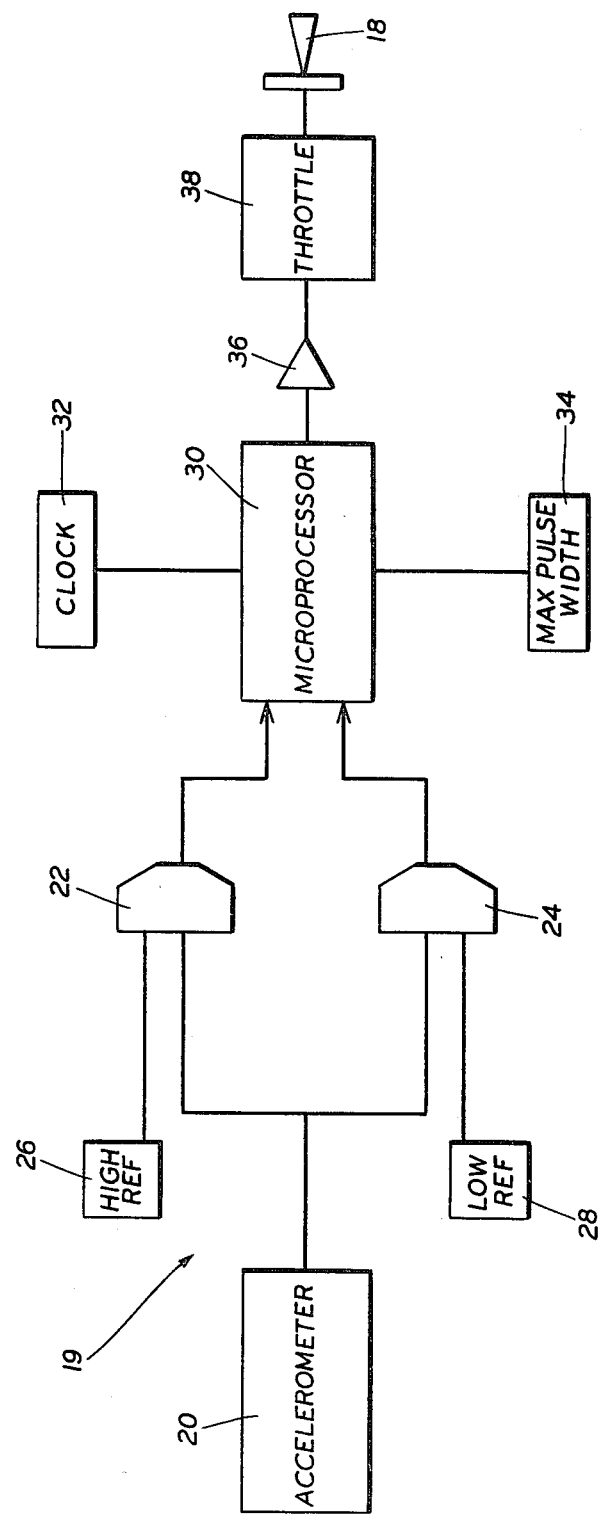
FIG. 7 is a block diagram of circuitry for controlling firing of a gas thruster in accordance with the waveform sequences shown in FIGS. 4a–4c.

Referring now to FIG. 7, a system 19 for controlling firing of nutation damping gas thruster 18 comprises a pair of comparators 22 and 24 having one input each coupled to the output of accelerometer 20 and the remaining comparator inputs coupled, respectively, to reference voltage sources 26 and 28 corresponding respectively to a maximum nutation angle at which a nutation damping sequence is initiated and a minimum nutation angle at which the sequence is terminated. Accelerometer 20 may be a linear or angular accelerometer, or other device, that monitors the nutation angle $\theta$ of the spacecraft 10 (FIG. 1). An angular accelerometer, however, is preferred to simplify alignment on the spacecraft. Accelerometer 20 generates a signal that is proportional to the instantaneous magnitude (angle) of nutation motion of the spacecraft. When the accelerometer signal is greater than the predetermined maximum nutation angle represented by the voltage generated by source 26, comparator 22 generates a first signal. When the output of accelerometer 20, on the other hand, is lower than the predetermined minimum nutation angle corresponding to the voltage generated by source 28, comparator 24 generates a second signal. If the predetermined minimum nutation angle as set by source 28 is selected to equal the magnitude of the expected nutation angle reduction during the pull down mode (sequence shown in FIG. 4C), the nutation at the end of the pull down mode, which is the end of the thruster firing sequence, should be near zero. The first and second signals generated by the two comparators 22 and 24 are supplied as input signals to a conventional microprocessor 30. Other inputs supplied to the microprocessor 30 include a pulse synchronization signal generated by clock 32 synchronized to the nutation of the spacecraft to provide proper phasing of the thruster 18 for nutation damping and a control signal generated by source 34 which identifies the duration of the maximum duration pulses P. The maximum pulse duration is predetermined or dynamically determined as a function of system parameters in a conventional manner. Although sources 32 and 34 are illustrated in FIG. 7 as constituting circuitry external to microprocessor 30, it is to be understood that the signals generated by sources 32 and 34 may be developed within the microprocessor.

Microprocessor 30 is programmed in a conventional manner to generate the waveform sequences shown in FIGS. 4a–4c in response to the reference signals generated by comparators 22 and 24 as well as to the data signals generated by sources 32 and 34. Thus, when the measured nutation angle is greater than the maximum nutation angle identified by voltage source 26, microprocessor 30 is initiated to generate the up pulsing sequence shown in FIG. 4a wherein the duration of successive pulses gradually increases from about zero to the predetermined maximum pulse duration P in, for example, 10 steps. Thereafter, the pulses generated by microprocessor 30 are maintained at the maximum pulse duration P for a time period until the nutation angle measured by accelerometer 20 has diminished to the minimum nutation angle corresponding to the voltage generated by low voltage source 28. The signal generated by comparator 24 controls microprocessor 30 to now generate the down pulsing sequence shown in FIG. 4c wherein the duration of successive pulses is gradually reduced from the maximum pulse duration p to about zero in, e.g., 10 steps.

The output of microprocessor 30 is supplied, following amplification in amplifier 36, to operate a throttle, or control valve 38 that controls firing of thruster 18.

In this disclosure, there is shown and described only the preferred embodiment of the invention, but it is to be understood that the invention is capable of use in various other combinations and environments and is capable of changes or modifications within the scope of the inventive concept as expressed herein. For example, although the circuitry shown in FIG. 7 is microprocessor based, it is to be understood that equivalent hard wire circuitry, such as counters suitably interconnected to generate the waveforms shown in FIGS. 4a–4c, could be provided.

I claim:

1. A method of operating a gas thruster to control nutation in a spinning body while minimizing body spin axis attitude disturbances, comprising the steps of:

sensing nutation of the spinning body;

in response to a predetermined maximum nutation, pulsing said gas thruster including gradually increasing the duration of successive gas pulses from a first duration to a subsequent second duration and then maintaining the durations of successive gas pulses at said second duration; and in response to a predetermined minimum nutation, gradually reducing the duration of successive gas pulses from said second duration to said first duration.

2. The method of claim 1, wherein said first duration is zero and said second duration is a predetermined maximum duration.

3. The method of claim 1 wherein said gradually increasing and gradually reducing durations of said gas pulses are independent of nutation level.

4. A method of operating a gas thruster to control nutation in a spinning body while minimizing body spin axis attitude disturbances, comprising the steps of:
sensing nutation of the spinning body; and
in response to a first predetermined nutation parameter, pulsing said gas thruster to modify said nutation parameter, including gradually increasing the duration of successive gas pulses from zero to a predetermined maximum duration and then, in response to a second predetermined nutation parameter, gradually decreasing the duration of successive gas pulses from said predetermined duration to zero.

5. The method of claim 4 wherein said gradually increasing and gradually decreasing durations of said gas pulses are independent of nutation level.

6. In a spin stabilized spacecraft including at least one gas thruster located on said spacecraft at a position spaced apart from the spin axis of the spacecraft, a method of damping spacecraft nutation while minimizing disturbances to spacecraft spin axis attitude, comprising the steps of sensing spacecraft nutation; and in response to a sensed nutation greater than a predetermined magnitude, pulsing said gas thruster to reduce nutation including gradually increasing the duration of each successive pulse from zero to a predetermined maximum duration and then, in response to a sensed nutation less than a predetermined magnitude, gradually decreasing the duration of successive pulses from said maximum duration to zero.

7. The method of claim 6, wherein said maintaining step includes maintaining said maximum gas pulse period until sensed nutation motion is less than a predetermined minimum magnitude.

8. The method of claim 6 wherein said gradually increasing and gradually decreasing durations of said pulses are independent of nutation level.

9. In a method of reducing nutation motion in a spin stabilized spacecraft having means for sensing spacecraft nutation motion and at least one gas thruster pulsed in response to spacecraft nutation greater than a predetermined magnitude to damp said nutation motion, an improvement for minimizing disturbances to the spacecraft spin axis attitude during nutation damping, comprising the steps of gradually increasing the duration of successive gas pulses from zero to a predetermined maximum duration and then, in response to spacecraft nutation less than a predetermined magnitude, gradually decreasing the duration of successive gas pulses from said predetermined duration to zero.

10. The method of claim 9 wherein said gradually increasing and gradually decreasing durations of said gas pulses are independent of nutation level.

11. The method of claim 4 or claim 6 or claim 9, wherein said pulsing step includes maintaining the duration of said gas pulses at said predetermined maximum duration for a time period before gradually decreasing the duration to zero.

12. A method of operating a gas thruster to control nutation in a spinning body while minimizing body spin axis attitude disturbances, comprising the steps of:
sensing nutation of said spinning body; and
in response to a nutation of a first predetermined level, pulsing said thruster in a gradually increasing fashion by gradually increasing the duration of successive gas pulses from said thruster; and then
in response to a nutation of a second predetermined level which is less than the first, pulsing said thruster in a gradually decreasing fashion by gradually decreasing the duration of successive gas pulses from said thruster.

13. The method of claim 12 wherein said gradually increasing and gradually decreasing durations of said gas pulses are independent of nutation level.

* * * * *